US012806949B2

(12) United States Patent
Bingle et al.

(10) Patent No.: US 12,806,949 B2
(45) Date of Patent: Nov. 24, 2026

(54) UNIBODY LOAD SUPPORT BRACKET ASSEMBLY

(71) Applicant: Air Lift Company, Lansing, MI (US)

(72) Inventors: Robert Bingle, Dewitt, MI (US); Mark Symons, Lansing, MI (US); Lee Foster Hovey, Lansing, MI (US)

( * ) Notice: Subject to any disclaimer, the term of this patent is extended or adjusted under 35 U.S.C. 154(b) by 0 days.

(21) Appl. No.: 19/299,787

(22) Filed: Aug. 14, 2025

(65) Prior Publication Data

US 2026/0124867 A1 May 7, 2026

Related U.S. Application Data

(60) Provisional application No. 63/715,742, filed on Nov. 4, 2024.

(51) Int. Cl.
*B60G 11/28* (2006.01)

(52) U.S. Cl.
CPC ........ *B60G 11/28* (2013.01); *B60G 2204/126* (2013.01)

(58) Field of Classification Search
CPC .. B60G 11/28; B60G 2204/126; B60G 9/003; B60G 11/465
USPC .................................................. 280/781, 785
See application file for complete search history.

(56) References Cited

U.S. PATENT DOCUMENTS 4,379,572 A 4/1983 Hedenberg
5,018,756 A 5/1991 Mitchell
5,271,638 A * 12/1993 Yale ..................... B60G 11/465 280/407.1
5,342,139 A * 8/1994 Hoffman ................. F16B 5/065 267/64.23
5,403,032 A * 4/1995 Hellwig ................. B60G 11/46 267/31
5,649,719 A * 7/1997 Wallace ................... B60G 7/02 280/124.108

(Continued)

FOREIGN PATENT DOCUMENTS

FR 2970903 A1 8/2012
JP 3196517 U 3/2015

OTHER PUBLICATIONS

Patent Cooperation Treaty (PCT), International Search Report and Written Opinion for Application PCT/US2025/053888 filed Nov. 4, 2025, mailed Mar. 5, 2026, International Searching Authority, US.

*Primary Examiner* — Toan C To
(74) *Attorney, Agent, or Firm* — McDonald Hopkins LLC

(57) ABSTRACT

The present invention provides a load support system for unibody vehicle frames, incorporating an upper load support bracket with a U-shaped configuration, including inner, center, and outer panels. The load support bracket enhances load distribution and structural integrity by improving conformance to the frame's contours. Mounting features align with pre-existing frame points and are longitudinally spaced from the air spring mounting location to enhance load distribution across the bracket. The upper bracket can feature asymmetrical vertical extension regions that accommodate various vehicle features and reinforce against transverse deflection. Air spring mounting features securely couple the bracket to the air spring. Overall, the load support system significantly reduces localized stress concentrations, improving vehicle stability and handling.

19 Claims, 5 Drawing Sheets

(56) References Cited

U.S. PATENT DOCUMENTS

| | | | | | |
|---|---|---|---|---|---|
| 5,938,221 | A * | 8/1999 | Wilson | F16F 1/368 | 267/260 |
| 6,224,074 | B1 * | 5/2001 | Cadden | B60G 9/02 | 280/678 |
| 6,406,007 | B1 * | 6/2002 | Wilson | B60G 11/02 | 280/124.17 |
| 6,434,907 | B1 * | 8/2002 | Simboli | B62D 24/02 | 296/205 |
| 6,871,862 | B2 * | 3/2005 | Chalin | B60G 7/02 | 280/124.157 |
| 7,896,369 | B2 * | 3/2011 | Tomlin | B60G 9/00 | 280/124.156 |
| 8,807,597 | B2 * | 8/2014 | Akaki | B62D 21/02 | 180/311 |
| 9,050,870 | B2 * | 6/2015 | Wilson | B60G 11/113 | |
| 9,586,630 | B2 * | 3/2017 | Kondo | B62D 33/0604 | |
| 9,649,906 | B2 * | 5/2017 | Myers | B60G 11/465 | |
| 9,662,950 | B2 * | 5/2017 | Rarey | B60G 11/12 | |
| 12,391,082 | B2 * | 8/2025 | Bradley | B60G 9/003 | |
| 2004/0056441 | A1 | 3/2004 | Chalin | | |
| 2014/0117640 | A1 | 5/2014 | Lamberti | | |
| 2019/0092407 | A1 * | 3/2019 | Jacobsma | B60G 11/28 | |
| 2023/0383813 | A1 | 11/2023 | Nguyen et al. | | |
| 2024/0075781 | A1 * | 3/2024 | Heon | B60G 9/003 | |

* cited by examiner

UNIBODY LOAD SUPPORT BRACKET ASSEMBLY

CROSS-REFERENCE TO RELATED APPLICATIONS

This application claims the benefit of U.S. Provisional Application 63/715,742, filed Nov. 4, 2024, the disclosure of which is incorporated by reference in its entirety.

BACKGROUND OF THE INVENTION

The present invention pertains to vehicle load support systems, specifically for unibody-frame vehicles. More particularly, it relates to a bracket assembly that effectively distributes and mitigates load stresses on unibody vehicle frames, optimizing load capacity while maintaining structural integrity.

Vehicles featuring a unibody frame design, such as the Mercedes Sprinter van, are known for their advantages in safety and fuel efficiency. Unlike body-on-frame constructions, where the body is mounted on a separate chassis, unibody frames integrate the body and structural support into a single unit. While unibody frames provide certain benefits, they are generally less suited to carrying heavy loads, as the frame structure lacks the robustness needed to handle high load stress.

When traditional load support mechanisms are applied to unibody vehicles, localized stress points can compromise the frame, causing bending, flexing, or, in extreme cases, structural failure. Conventional load support brackets, for example as shown in FIG. 2, typically use an upper bracket 200 with two standoffs 205 as primary contact points with the unibody frame 250. Each standoff 205 includes a contact surface 210 where it meets the unibody frame 250, creating concentrated load points that result in localized stress. This bracket design lacks adequate distribution of forces along the frame, making it prone to deformation over time, especially under dynamic loading conditions. An air spring 230 is positioned between the frame 250 and axle 260, but the limited surface area of contact surfaces 210 at each standoff 205 restricts the system's ability to manage varying load forces effectively.

Specifically, as illustrated in FIG. 3, the prior art bracket 200 creates high-pressure points at the contact areas 210 of the standoffs 205, which interface directly with the unibody frame 250. The grayscale stress analysis 300 in FIG. 3 visually represents how these concentrated load points generate elevated stress levels (PSI) at each standoff 205. These high-stress zones indicate that the prior art's bracket design, with its limited contact area at the standoffs, inadequately distributes load forces. Over time, this concentrated loading may deform or damage the unibody frame 250, particularly under dynamic loading conditions when vehicle movement amplifies the stress on these contact areas 210. This significant limitation highlights the need for an improved load support bracket that distributes forces more uniformly across a broader area of the frame, thereby preserving structural integrity under a range of load conditions.

SUMMARY OF THE INVENTION

The present invention provides a load support system for unibody vehicles, addressing the challenges of load distribution on unibody frames, such as those in the Mercedes Sprinter van. The system features an upper load support bracket with a U-shaped configuration comprising an inner panel, a center panel, and an outer panel. This bracket engages pre-existing mounting points on the unibody vehicle frame, ensuring secure attachment.

The upper load support bracket improves load distribution by conforming to the contours of the unibody structure. This reduces localized stress concentrations and mitigates issues such as bending and flexing of the unibody frame, thus preserving the structural integrity of the frame under dynamic loading conditions.

Vertical extension regions of the inner and outer panels provide higher reinforced mounting features that align with mounting holes for the factory suspension. These areas of the frame are reinforced to handle loads, accordingly by mounting the bracket at these locations additional reinforcement can be provided, enhancing overall structural rigidity. Air spring mounting features are integrated into the center panel, allowing for secure coupling to the upper portion of the air spring, thus facilitating effective load management.

Overall, the load support system enhances vehicle stability and handling by effectively distributing load forces across a broader area of the unibody frame while maintaining compatibility with different vehicle models.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DESCRIPTION OF THE CURRENT EMBODIMENT

Figure 1:
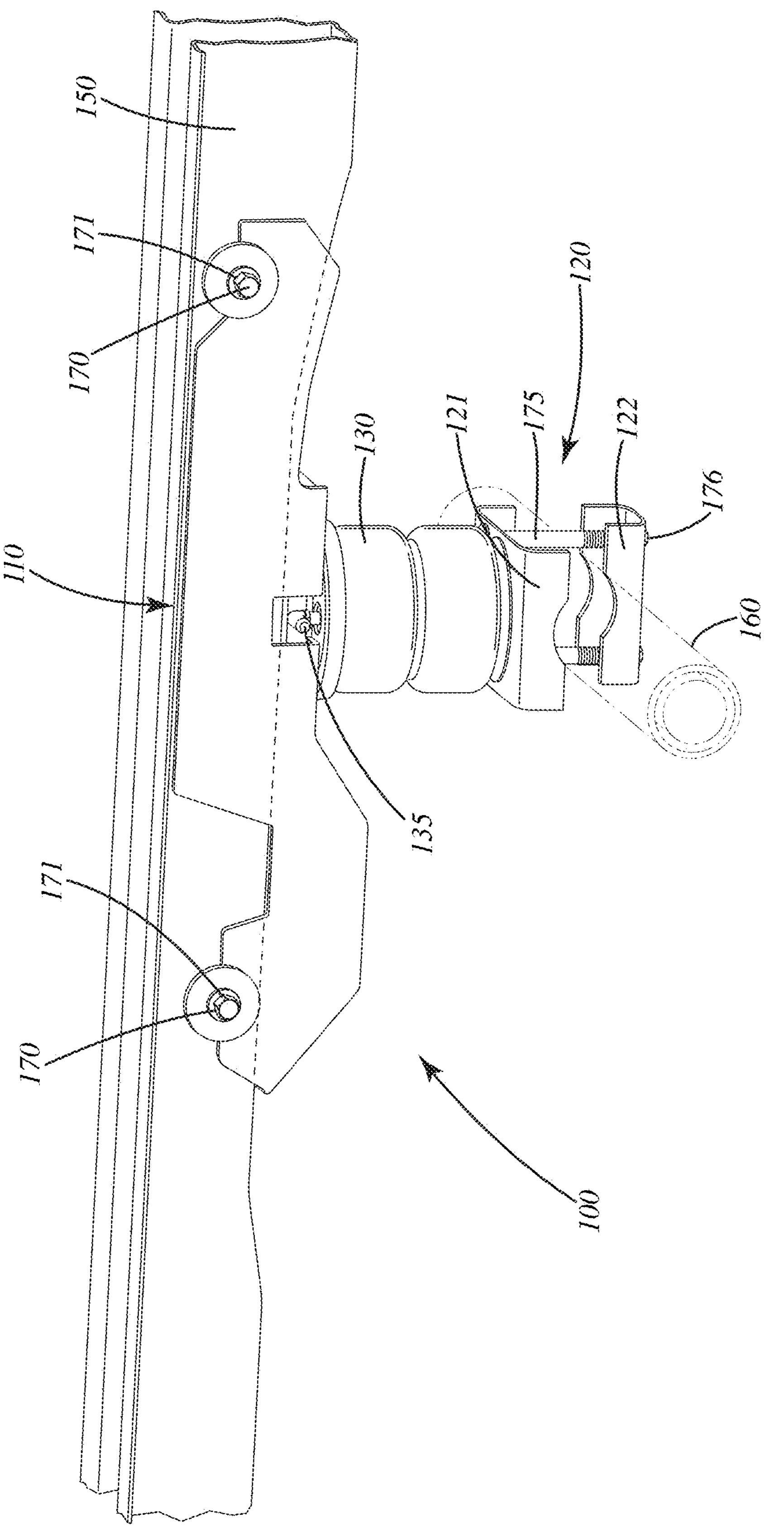
FIG. 1 illustrates a perspective view of a unibody load support bracket assembly in accordance with the present disclosure, installed on a unibody vehicle frame.
Figure 4:
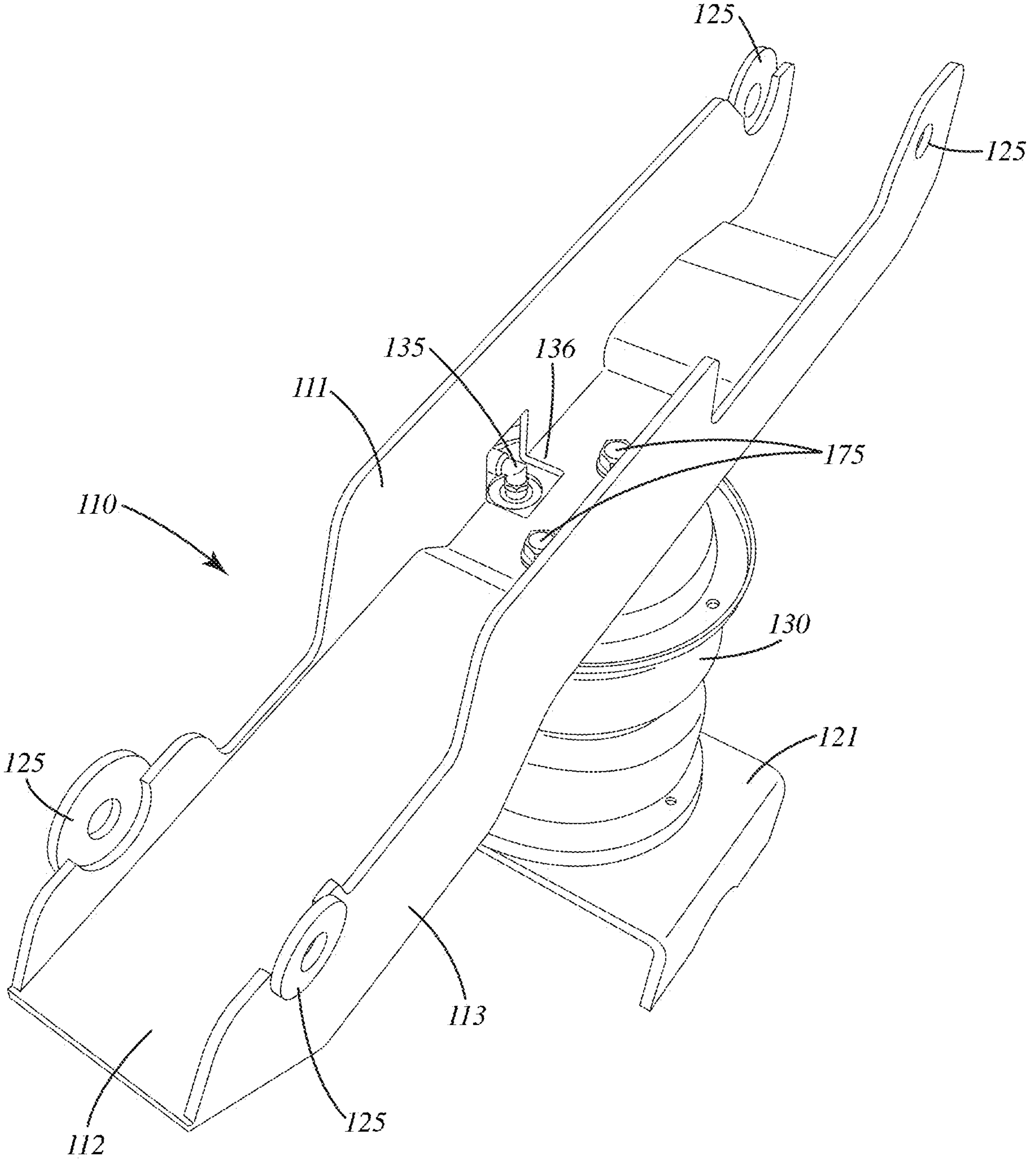
FIG. 4 illustrates a perspective view of the unibody load support bracket, highlighting its U-shaped configuration, including the inner, center, and outer panels.

The present invention relates to a unibody load support system 100 specifically configured for unibody vehicles, providing an effective solution for load distribution on unibody frames. As illustrated in FIG. 1, the system includes an upper load support bracket 110 and upper and lower roll plates 121, 122, each designed to work in conjunction to improve load capacity while maintaining the structural integrity of the vehicle frame. Perhaps as best shown in FIG. 4, the upper load support bracket 110 features a U-shaped configuration. Specifically, the bracket 110 includes an inner panel 111, a center panel 112, and an outer panel 113 welded into a U-channel shape. This configuration is particularly advantageous for vehicles such as the Mercedes Sprinter van, which has a unibody frame that can handle varying load levels. The load support system aims to enhance load capacity while reducing stress concentrations that could compromise the unibody structure.

In the current embodiment, the upper load support bracket 110 attaches securely to the unibody vehicle frame 150 by way of bolts 170 and washers 171, with each bolt aligning with pre-existing mounting points on the unibody vehicle frame 150 to ensure reliable attachment and alignment. In alternative embodiments, different types of fasteners may be used to couple the bracket 110 and the unibody vehicle frame 150 together, allowing flexibility for various vehicle models.

Figure 5:
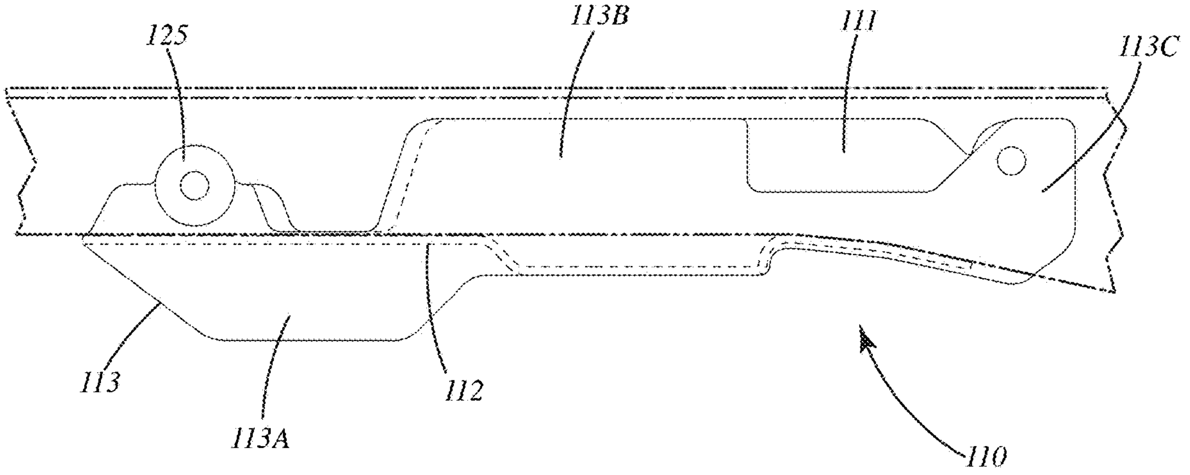
FIG. 5 illustrates a side view of the upper load support bracket from the outer panel perspective, illustrating the configuration and mounting features that align with pre-existing mounting points on the unibody vehicle frame and also emphasizing the asymmetrical vertical extension regions that provide reinforcement and accommodate various vehicle features.

Perhaps as best shown in FIG. 5, the U-shaped configuration of the bracket 110, particularly the center panel 112, generally follows the contours of the unibody frame 150, allowing it to effectively distribute load forces over a broader area and mitigate localized stress concentrations. Focusing on the center panel 112 of this configuration, it conforms closely to the bottom of the unibody vehicle frame 150, providing a stable and expansive load-bearing structure. The inner and outer panels 111 and 113 incorporate mounting features 125 that align longitudinally along the frame 150, providing stable attachment points that support the system under both static and dynamic load conditions. Additionally, by positioning these mounting features 125 at locations spaced longitudinally away from the air spring mounting location, the bracket structure reduces concentration of stresses, achieving a more uniform load distribution across the bracket 110. The mounting features 125 may also be vertically distributed on the inner and outer panels 111 and 113 of the upper load support bracket 110 to maintain alignment with the pre-existing mounting features on the unibody frame 150, further enhancing load distribution across the frame. For example, the mounting features of panel section 113A are slightly lower than the mounting features of panel section 113C.

Figure 6:
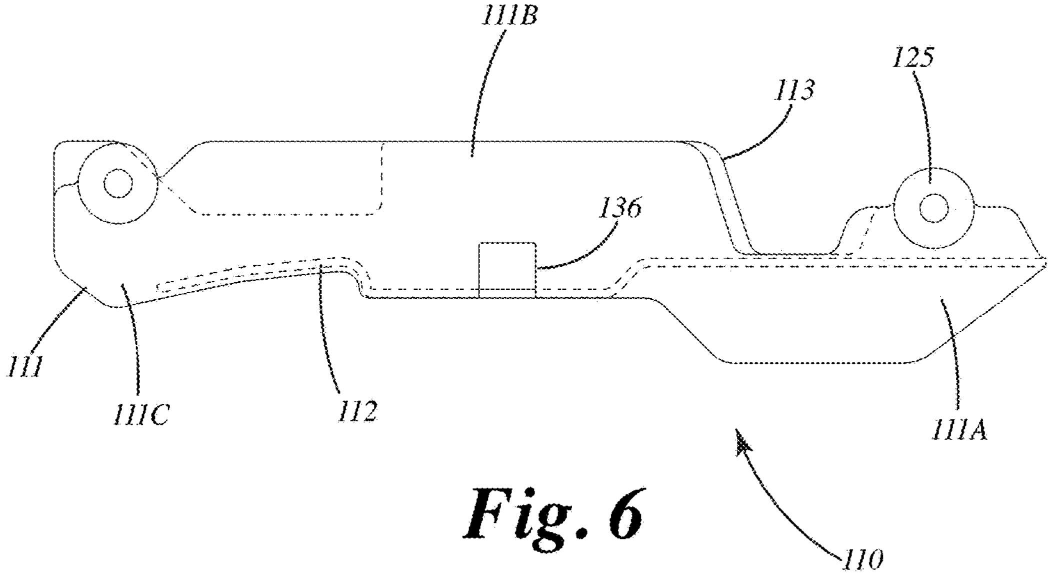
FIG. 6 depicts a side view of the upper load support bracket from the inner panel perspective, illustrating the configuration and mounting features that align with pre-existing mounting points on the unibody vehicle frame and also emphasizing the asymmetrical vertical extension regions that provide reinforcement and accommodate various vehicle features.

The upper load support bracket 110 can include vertical extension regions on both the inner and outer panels 111 and 113, as perhaps best shown in FIGS. 5 and 6. These extensions are specifically adapted to reinforce the bracket structure against transverse forces experienced by the unibody frame 150 under dynamic loading conditions. The mounting features/apertures 125 on the inner and outer panels align with existing mounting holes for the factory suspension. The unibody frame is reinforced to handle loads in these areas, accordingly mounting the bracket to these portions of the frame provides improved load distribution. Alternatively, or in addition, these extensions can be shaped to accommodate various vehicle features. As depicted in FIG. 5, the outer panel 113 includes vertical extension sections 113A, 113B, and 113C, while FIG. 6 shows the inner panel 111 with vertical sections 111A, 111B, and 111C. These vertical extensions provide additional structural support by extending vertically above and/or below the center panel 112. The size and shape of the panels 111, 113 including the various vertical extensions can be shaped to provide enhanced support without being over-designed with extra materials, which would add extra weight.

For example, section 113A extends both above and below the center panel 112, allowing mounting feature 125 to align with the unibody mounting point on the frame 150 and to provide structural support against transverse forces. Panel section 113C conforms closely to the contour of the center panel 112, which follows the unibody frame 150, ensuring stable alignment of mounting feature 125 with the unibody frame mounting point.

This reinforcement arrangement mitigates transverse deflection, which can cause unwanted twisting of the frame, and contributes to load stability across varying terrain or driving conditions. The asymmetrical design of the extension regions allows bracket 110 to adapt to vehicle-specific features, providing necessary support while accommodating structural variations in the unibody frame 150. The lower section of panel 113C, for instance, extends below the center panel 112, enhancing load stability and distributing forces uniformly along the bracket's length.

The unibody load support system 100 can interface with an air spring 130 positioned between the unibody vehicle frame 150 and the vehicle axle 160. The upper load support bracket 110 couples to the air spring 130 at the top, while the upper and lower roll plates 121, 122 couple to and supports the air spring, securing it around the axle 160. As shown in FIG. 1, this configuration enhances load distribution by providing a cushion between the frame 150 and axle 160, absorbing dynamic loads and reducing frame stress.

As shown in FIGS. 4-6, at the air spring mounting location, the center panel 112 of the upper load support bracket 110 bends slightly downwardly, dipping away from the unibody frame 150. This dip creates a gap that allows the head of each air spring bolt 175, which secures the air spring 130 to the center panel 112, to sit between the panel and the unibody frame. This arrangement provides secure attachment points while preventing interference between the bolt heads and the frame 150.

Additionally, this gap offers space for the air inlet 135 of the air spring 130 to extend upward from the air spring and pass horizontally through the air inlet notch 136 formed in the inner and center panels. The alignment of the notch 136 ensures that the air inlet 135 has sufficient clearance to connect to the vehicle's air system without obstruction, supporting efficient integration of the air spring 130 within the unibody load support system 100. Further, extension portion 111B extends vertically well above the center panel 112, adding structural integrity around the notch 136.

The unibody load support system 100 includes upper and lower roll plates 121, 122 designed to secure the air spring 130 to the vehicle axle 160. The upper roll plate 121 and lower roll plate 122 together encircle the axle 160 to provide stable support for the air spring 130. Bolts 175 and nuts 176 fasten the upper roll plate 121 to the lower roll plate 122, ensuring a secure attachment around the axle 160. This roll plate configuration stabilizes the air spring under dynamic loads by distributing forces across the axle circumference, thereby enhancing load absorption. Together, the roll plates help to facilitate an even distribution of forces encountered during vehicle operation, which preserves both the air spring's performance and the structural integrity of the unibody frame 150.

The upper roll plate 121 couples to the lower portion of the air spring 130, providing a stable foundation for transferring load forces from the axle 160 through the bracket and into the air spring. From the air spring 130, these forces are dampened, but further distributed to the upper load support bracket 110, which in turn disperses them across the unibody frame 150. This coordinated transfer of load through both the lower and upper brackets enhances overall load stability, reducing localized stress on the unibody frame 150 and maintaining the structural integrity of the vehicle. By aligning securely with the air spring 130, the roll plates ensures that the air spring remains in place and effectively absorbs and distributes load forces, even under dynamic loading conditions.

The unibody load support system 100, through its upper load support bracket 110, upper and lower roll plates 121, 122, and integrated air spring 130, provides comprehensive load distribution and frame protection for unibody vehicles. The upper bracket structure and mounting allows the system to manage and disperse both static and dynamic loads efficiently, reducing localized stress and minimizing the risk of structural deformation. The air spring 130 further enhances load management by dampening sudden forces, while the strategic placement of mounting features 125 along the inner and outer panels 111 and 113 enables secure attachment to the unibody frame 150.

The system's adaptable configuration allows it to be tailored to various unibody vehicle models, ensuring compatibility with differing frame structures and mounting points. Constructed from high-strength, load-bearing materials, the brackets offer durability and resistance to environmental factors, which extends the lifespan of the system under a range of operational conditions. In the current embodiment, the panels 111, 112, 113 are steel wall stock. This robust construction ensures that the system can withstand prolonged exposure to heavy loads, vibration, and other mechanical stresses encountered during vehicle operation.

Figure 2:
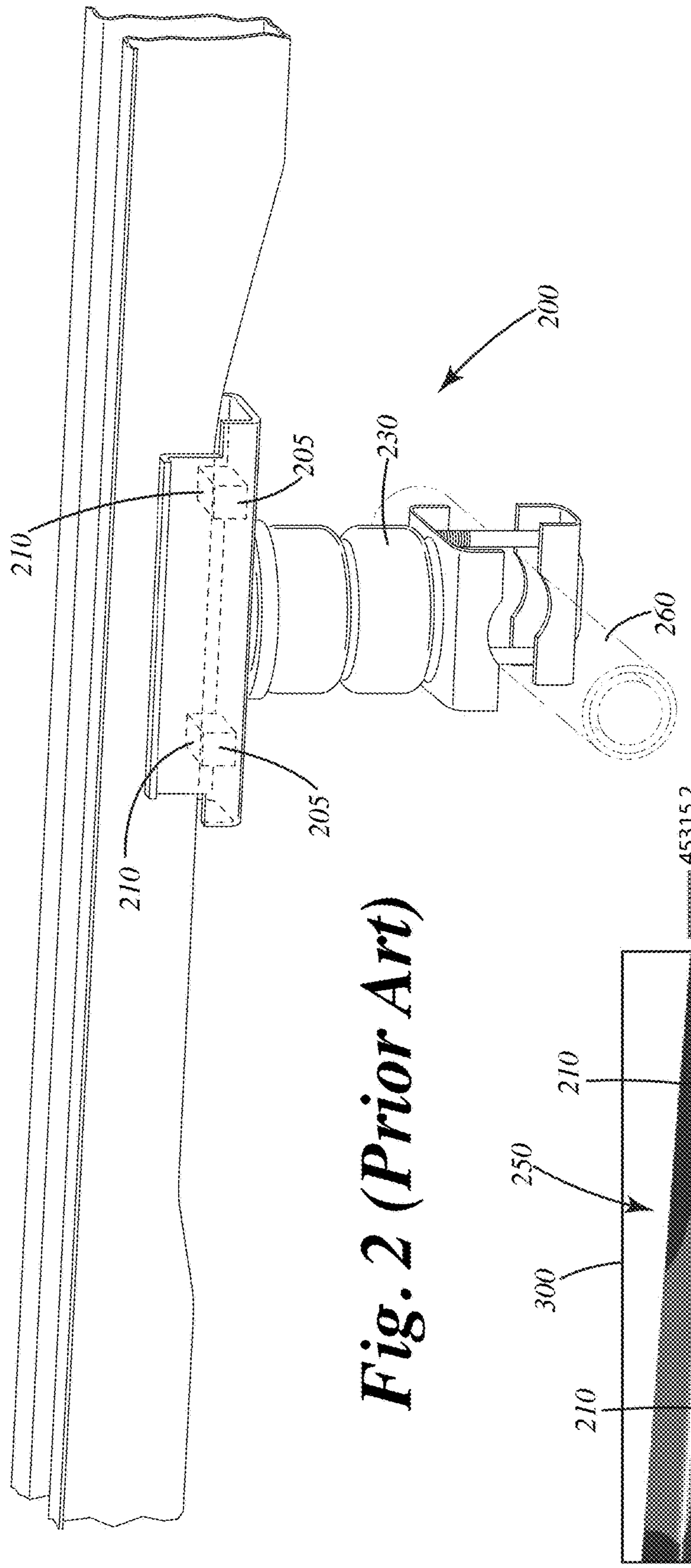
Fig. 2 (Prior Art)
FIG. 2 illustrates a prior art unibody load support bracket assembly.
Figure 3:
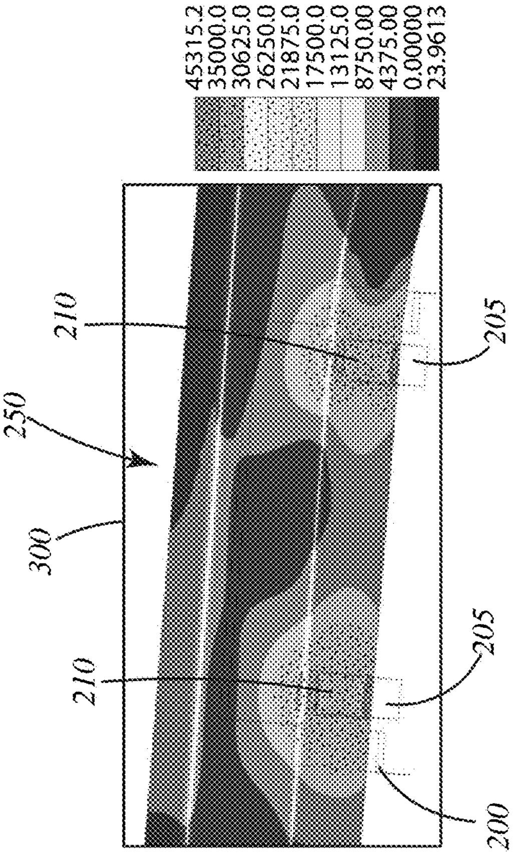
Fig. 3 (Prior Art)
FIG. 3 illustrates the poor load distribution of the prior art bracket of FIG. 2 at the points of contact to the unibody frame.
Figure 7:
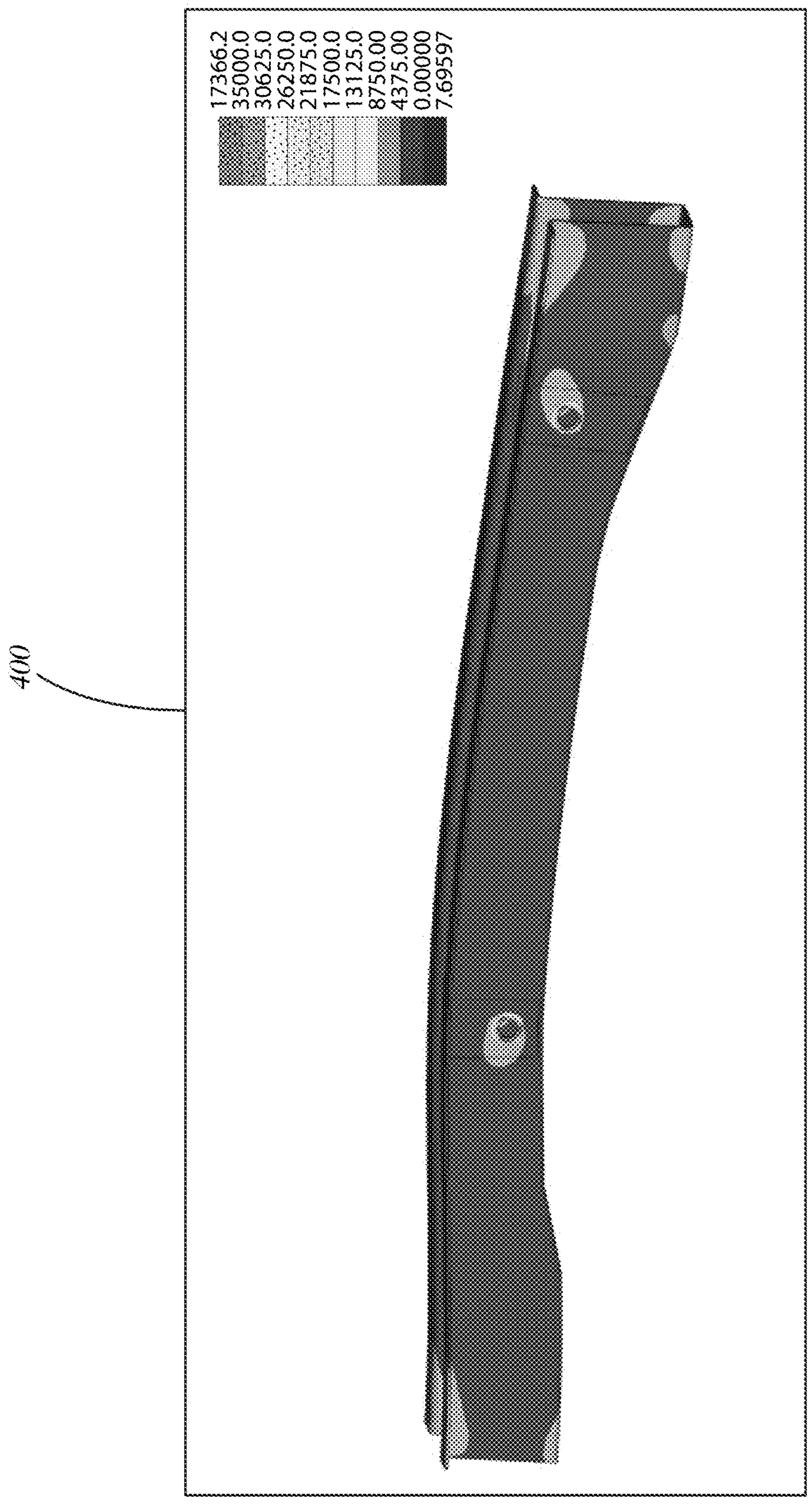
FIG. 7 shows a visual representation of stress distribution across a unibody vehicle frame being supported by an embodiment of the load support system of the present disclosure, demonstrating the improvements in load distribution.

As illustrated in FIG. 7, the unibody load support system 100 achieves an even distribution of stress across the unibody frame 150, as represented in the stress analysis 400. The stress analysis 400 shows that the majority of the unibody frame experiences low stress, reflecting the system's effective load distribution. Only mild stress levels are observed near the mounting points, where the inner and outer panels 111 and 113 interface with the unibody frame 150 to provide secure attachment. These mild stress levels near the mounting points are intentional and indicate that the system directs forces in a controlled manner, preventing high concentrations that could lead to structural degradation. Unlike prior systems that create high-pressure points (as shown in FIGS. 2 and 3), the unibody load support system 100 uniformly disperses forces across a broader area of the frame, preserving frame stability and ensuring the integrity of the structure under dynamic load conditions.

By dispersing load forces across a broader area of the unibody frame 150, the unibody load support system 100 enhances vehicle control, improves handling, and reduces frame flex, contributing to greater overall stability and safety during transport. As a result, this system allows vehicles to carry heavier loads with improved stability and control, providing a reliable solution for load management in unibody-framed vehicles.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation (s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A load support system for installation on a unibody vehicle frame and for use with an air spring positioned between the unibody vehicle frame and a vehicle axle, the system comprising:

an upper load support bracket configured to generally conform to the contour of the unibody vehicle frame, the upper load support bracket configured to couple to the air spring and distribute load forces across the unibody vehicle frame, thereby reducing localized stress concentrations;

a roll plate assembly configured to couple to a lower portion of the air spring and surround the vehicle axle; and wherein the upper load support bracket includes an inner panel, a center panel, and an outer panel arranged in a U-shaped configuration.

2. The load support system of claim 1, wherein the inner panel and outer panel each include unibody vehicle frame mounting features that align with pre-existing mounting features of the unibody vehicle frame to secure the upper load support bracket to the unibody vehicle frame.

3. The load support system of claim 2, wherein the unibody vehicle frame mounting features of the upper load support bracket are positioned longitudinally along the inner and outer panels, facilitating distribution of forces from the unibody vehicle frame across the upper load support bracket.

4. The load support system of claim 2, wherein the unibody vehicle frame mounting features on the inner and outer panels are vertically distributed to maintain alignment with the pre-existing mounting features on the unibody vehicle frame.

5. The load support system of claim 2, wherein the mounting features on the inner and outer panels of the upper load support bracket are shaped to conform to the pre-existing mounting features of the unibody vehicle frame.

6. The load support system of claim 5, wherein the mounting features of the inner and outer panels are spaced from the vicinity of the air spring mounting features to enhance load distribution across the upper load bracket.

7. The load support system of claim 1, wherein the inner panel and outer panel include vertical reinforcement sections adapted to reduce transverse deflection in the unibody vehicle frame during dynamic load conditions.

8. The load support system of claim 1, wherein the center panel of the upper load support bracket includes air spring mounting features configured for coupling the upper load support bracket to an upper portion of the air spring.

9. The load support system of claim 8, wherein the inner panel and center panel of the upper load support bracket include a notch configured to accommodate an air inlet for the air spring.

10. The load support system of claim 1, wherein the inner and outer panels include reinforcement regions extending vertically above and/or below the center panel to enhance load distribution against transverse forces or accommodate vehicle features.

11. The load support system of claim 1, wherein the upper load support bracket is composed of a high-strength, load-bearing material suitable for withstanding distributed load forces across the unibody vehicle frame.

12. The load support system of claim 1, wherein the upper load support bracket is configured to span a sufficient area of the unibody vehicle frame to enhance load distribution along the frame and improve overall vehicle stability and handling.

13. The load support system of claim 1, wherein the upper load support bracket is arranged to conform to the contour of the unibody vehicle frame to distribute load forces across a broader area of the frame than those directly above the vehicle axle.

14. A load support system for installation on a unibody vehicle frame and for use with an air spring positioned between the unibody vehicle frame and a vehicle axle, the system comprising:

an upper load support bracket having a U-shaped configuration that includes an inner panel, a center panel, and an outer panel, wherein:

the inner and outer panels extend longitudinally along the unibody frame, incorporating mounting features that align with pre-existing mounting points to secure the upper load support bracket to the unibody vehicle frame;

the center panel joins the inner and outer panels and generally follows a contoured portion of the bottom of the unibody vehicle frame, providing structural integrity to the upper load support bracket and a unified support structure;

the inner and outer panels extend vertically above and/or below the center panel providing extension regions that accommodate various vehicle features;

air spring mounting features located on the center panel are configured to securely couple the upper load support bracket to an upper portion of the air spring;

whereby the upper load support bracket distributes load forces across the unibody vehicle frame reducing localized stress concentrations and improving overall vehicle stability and handling.

15. The load support system of claim 14, wherein the vertical extension regions reinforce the upper load support bracket to reduce transverse deflection during dynamic loading conditions and improve structural rigidity.

16. The load support system of claim 14, wherein the extension regions of the inner and outer panels that extend vertically above and/or below the center panel are asymmetrical, tailored to accommodate various vehicle features, and enhance load distribution across the upper load support bracket.

17. The load support system of claim 14, wherein the mounting features of the inner and outer panels include contours that conform to the shape of the pre-existing mounting points on the unibody vehicle frame, facilitating secure attachment.

18. A unibody load support bracket for installation on a unibody vehicle frame, comprising:

an upper bracket having a U-shaped configuration that includes an inner panel, a center panel, and an outer panel, wherein:

the inner and outer panels extend longitudinally along the unibody frame and incorporate mounting features that align with pre-existing mounting points for secure attachment;

the center panel joins the inner and outer panels and generally follows a contoured portion of the bottom of the unibody vehicle frame, enhancing structural integrity;

vertical extension regions of the inner and outer panels extend above and/or below the center panel.

19. The unibody load support bracket of claim 18, wherein the mounting features on the inner and outer panels are contoured to conform to the shape of the pre-existing mounting points on the unibody vehicle frame, thereby facilitating secure attachment and enhancing load distribution.

* * * * *